(12) United States Patent
Foster et al.

(10) Patent No.: US 8,793,444 B2
(45) Date of Patent: Jul. 29, 2014

(54) MANAGING LARGE PAGE MEMORY POOLS

(75) Inventors: Alfred F. Foster, Wappingers Falls, NY (US); David Horn, Poughkeepsie, NY (US); Charles E. Mari, Wappingers Falls, NY (US); Matthew J. Mauriello, Fishkill, NY (US); Robert Miller, Jr., Poughkeepsie, NY (US); Mariama Ndoye, Poughkeepsie, NY (US); Michael G. Spiegel, Monroe, NY (US); Peter G. Sutton, Lagrangeville, NY (US); Scott B. Tuttle, Staatsburg, NY (US); Elpida Tzortzatos, Lagrangeville, NY (US); Chun Kwan K. Yee, Woodstock, NY (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 13/101,735

(22) Filed: May 5, 2011

(65) Prior Publication Data
US 2012/0284479 A1 Nov. 8, 2012

(51) Int. Cl.
*G06F 12/00* (2006.01)
(52) U.S. Cl.
USPC .......................................... 711/154; 711/170
(58) Field of Classification Search
USPC ......... 711/170, 159, 160, 133, 165, 200–206; 707/813, 999.206
See application file for complete search history.

(56) References Cited

U.S. PATENT DOCUMENTS

| 4,638,424 | A | 1/1987 | Beglin et al. |
|---|---|---|---|
| 4,771,375 | A | 9/1988 | Beglin et al. |
| 5,394,539 | A | 2/1995 | Neuhard et al. |
| 5,675,790 | A | 10/1997 | Walls |
| 5,784,698 | A | 7/1998 | Brady et al. |
| 5,784,699 | A | 7/1998 | McMahon et al. |
| 5,784,707 | A | 7/1998 | Khalidi et al. |
| 5,813,045 | A | 9/1998 | Mahalingaiah et al. |
| 6,061,763 | A | 5/2000 | Rubin et al. |
| 6,112,301 | A | 8/2000 | Johnson |
| 6,182,089 | B1 * | 1/2001 | Ganapathy et al. .................. 1/1 |
| 6,202,134 | B1 | 3/2001 | Shirai |
| 6,223,335 | B1 | 4/2001 | Cartwright, Jr. et al. |
| 6,598,143 | B1 | 7/2003 | Baker et al. |
| 6,701,420 | B1 | 3/2004 | Hamilton et al. |
| 6,718,445 | B1 | 4/2004 | Lewis et al. |
| 6,738,866 | B2 | 5/2004 | Ting |
| 6,782,466 | B1 | 8/2004 | Steele et al. |
| 6,889,307 | B1 | 5/2005 | Scheuerlein |

(Continued)

OTHER PUBLICATIONS z/Os Concepts, IBM, © 2006, 2010, attached as zconcepts_book.pdf.*

(Continued)

*Primary Examiner* — Matthew Bradley
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

Large page memory pools are managed. Thresholds are used to determine if the number of pages in a large page memory pool is to be adjusted. If the number of pages is to be increased, a particular technique is provided for adding additional pages to the pool. Further, if there are too many pages in the pool, one or more pages may be removed.

20 Claims, 6 Drawing Sheets

(56) References Cited

U.S. PATENT DOCUMENTS

| | | | |
|---|---|---|---|
| 6,961,835 B2 | 11/2005 | Lightstone et al. | |
| 7,003,647 B2 | 2/2006 | Jacobs et al. | |
| 7,080,081 B2 | 7/2006 | Agarwal et al. | |
| 7,225,313 B2 | 5/2007 | Mather et al. | |
| 7,236,974 B2 | 6/2007 | Bhattacharjee et al. | |
| 7,437,529 B2* | 10/2008 | Burugula et al. | 711/171 |
| 7,484,072 B2 | 1/2009 | Hepkin et al. | |
| 7,543,123 B2 | 6/2009 | Evanchik et al. | |
| 7,765,211 B2 | 7/2010 | Bhattacharjee et al. | |
| 7,802,070 B2 | 9/2010 | Cholleti et al. | |
| 8,312,242 B2 | 11/2012 | Casper et al. | |
| 8,417,912 B2 | 4/2013 | Olszewski | |
| 2003/0084266 A1 | 5/2003 | Knippel et al. | |
| 2004/0128466 A1 | 7/2004 | Kadohiro | |
| 2005/0005080 A1* | 1/2005 | Dunshea et al. | 711/159 |
| 2006/0004977 A1* | 1/2006 | Jann et al. | 711/170 |
| 2007/0156997 A1 | 7/2007 | Boule et al. | |
| 2008/0104358 A1 | 5/2008 | Noel et al. | |
| 2009/0055609 A1 | 2/2009 | Kuczynski et al. | |
| 2010/0070733 A1 | 3/2010 | Ng et al. | |
| 2010/0106930 A1* | 4/2010 | Foltz et al. | 711/165 |
| 2010/0161929 A1 | 6/2010 | Nation et al. | |
| 2010/0211756 A1 | 8/2010 | Kaminski et al. | |
| 2011/0087857 A1* | 4/2011 | Bomma et al. | 711/206 |
| 2012/0054466 A1* | 3/2012 | Devendran et al. | 711/207 |
| 2012/0246386 A1* | 9/2012 | Akutsu et al. | 711/103 |
| 2012/0284457 A1 | 11/2012 | Foster et al. | |
| 2012/0284458 A1 | 11/2012 | Foster et al. | |
| 2012/0284478 A1 | 11/2012 | Brooker et al. | |
| 2012/0284483 A1 | 11/2012 | Foster et al. | |

OTHER PUBLICATIONS

"Advanced Operating Systems and Kernel Operations Techniques and Technologies", Wiseman et al, published by Information Science Reference, Hershey, New York, Copyright © 2010 by IGI Global, attached as AdvancedOS.pdf.*

"Practical, transparent operating system support for superpages", Navaro et al, Rice University, ACM SIGOPS Operating Systems Review—OSDI '02, vol. 36 Issue SI, Winter 2002, pp. 89-104, attached as Navarro.pdf.*

"Implementation of Multiple Pagesize Support in HP-UX", Subramanian et al, Proceedings of the USENIX Annual Technical Conference (NO 98), Jun. 1998, attached as MultiplePagesizeSupport_USENIX.pdf.*

"Program Analysis for Page Size Selection", Gopinath et al, IEEE 1996, Document ID 0-818-7557-8/96, pp. 189-194, attached as PageSizeSelection.pdf.*

"Using Virtual Memory to Improve Cache and TLB Performance", Romer, Dissertation, University of Washington, 1998, attached as Romer1998.pdf.*

"A survey of large-page support", Wienand, University of New South Sales, 2006, attached as SurveyLargePageSupport.pdf.*

"Surpassing the TLB Performance of Superpages with Less Operating System Support", Talluri et al, University of Wisconsin, Published ACM, 1994, Document ID 0-89791-660-3/94/0010, pp. 171-182, attached as TLBPerformanceSuperPages.pdf.*

"GISP: A Transparent Superpage Support Framework for Linux", Qu et al, Document ID 1-4244-1027-4/07, IEEE 2007, pp. 359-364, attached as TransparentSuperPageSupportLinux.pdf.*

"Transparent Large-Page Support for Itanium Linux", Wienand, University of New South Wales, Jul. 14, 2008, attached as TransparentSuperPageSupportltanium.pdf.*

"Performance Improvement for Multicore Processors Using Variable Page Technologies", Zhang et al, 2011 Sixth IEEE International Conference on Networking, Architecture, and Storage, Document ID 978-0-7695-4509-7/11, pp. 230-235, attached as VariablePageTech.pdf.* z/Architecture Principles of Operation, published by IBM, document No. SA22-7832-08, p. 10-108, attached as zArchitecture_Principles_of_Operation_page10-108.pdf.*

"z/Architecture—Principles of Operation", IBM Publication No. SA22-7832-08, Aug. 2010

Olszewski, Bret R., et al., "Management of Low-Paging Space Conditions in an Operating System," U.S. Appl. No. 12/875,831, filed Sep. 3, 2010.

Foster, Alfred F., et al., "Selecting an Auxiliary Storage Medium for Writing Data of Real Storage Pages," U.S. Appl. No. 13/101,725, filed May 5, 2011.

Brooker, Christopher G., et al., "Managing Storage Extents and the Obtaining of Storage Blocks within the Extents," U.S. Appl. No. 13/101,731, filed May 5, 2011.

Foster, Alfred F., et al., "Managing Allocation of Memory Pages," U.S. Appl. No. 13/101,791, filed May 5, 2011.

Office Action for U.S. Appl. No. 13/459,144 dated May 22, 2013, pp. 1-32.

Office Action for U.S. Appl. No. 13/101,725 dated May 5, 2011, pp. 1-46.

Office Action for U.S. Appl. No. 13/101,731 dated Jun. 5, 2013, pp. 1-58.

Siegel, J.J. et al., "Compare Double and Swap Extended Instruction," IPCOM000085697D, Mar. 2005, pp. 1.

Kinkade, J.D., et al., "Compare and Swap Implementation of Task Logic," IPCOM000079473D, Feb. 2005, pp. 1-3.

Office Action for U.S. Appl. No. 13/101,791 dated Jul. 30, 2013, pp. 1-42.

Weisberg, P. and Y. Wiseman, "Using 4KB Page Size for Virtual Memory is Obsolete," Jul. 2009, pp. 262-265.

Walsh, Kathy, "z/OS 1.9: Large Page Support," IBM Advanced Technical Support, Apr. 2008, pp. 1-12.

Tzortzatos, Elpida, "z/OS Basics: Virtual Storage Management (VSM) Overview," 2009 (no further date information available), pp. 1-68.

"AIX Version 5.3—Performance Management", IBM Reference No. SC23-4905-06, Seventh Edition, Oct. 2009, pp. 1-416.

Wang, Feng, "Storage Management in Large Distributed Object-Based Storage Systems", University of California, Dec. 2006, pp. 1-195.

Matyas, M. et al., "Reversible Data Mixing Procedure for Efficient Public-Key Encryption," Oct. 1998, pp. 1-12.

Scheifler, Robert W., "X Window System Protocol, Version 11, Alpha Update," Jun. 1987, pp. 1-90.

"z/Architecture—Principles of Operation", IBM Publication No. SA22-7832-08, Aug. 2010, pp. 1-1496.

Murray, Bill, "Mixing Formal and Dynamic Verification, Part 1," SCDsource 2007-2010, pp. 1-31 (no further date information available).

Khalidi, Yousef A., et al., "Virtual Memory Support for Multiple Pages," Sun Microsystems Laboratories, Inc., Sep. 1993, pp. 1-7.

Talluri, Madhusudhan, et al., "Tradeoffs in Supporting Two Page Sizes," Jun. 1992, pp. 415-424.

"Intelligent and Automated Allocation/Re-allocation of Paging Space to Enhance the Overall Operating System Performance," IP.com No. IPCOM000153048D, May 2007, pp. 1-4.

Tian, Yi et al., "Efficient Data Placement and Replacement Algorithms for Multiple-Level Memory Hierarchy," Proc. 10th International Conference on Parallel and Distributed Computing Systems, Oct. 1998, pp. 196-201.

Beretvas, Thomas, "Paging Enhancements in VM/SP HPO," pp. 728-737, Dec. 1984.

Knox, Deborah, et al., "Disk Swapping in Paged Distributed Virtual Memory Systems," pp. 153-157, Oct. 1994.

* cited by examiner

MANAGING LARGE PAGE MEMORY POOLS

BACKGROUND

One or more aspects of the present invention relate, in general, to managing memory of a computing environment, and in particular, to managing memory pools.

A computing environment may include main memory, as well as auxiliary storage, such as direct access storage devices (DASD) or flash memory. Main memory includes pages of memory that are backed by real storage, referred to as real storage frames. These pages are ready to be accessed by applications, instructions, operations, or other entities. Main memory is limited in space, and therefore, typically only the most recently used pages of memory are maintained in main memory. The other pages of memory are maintained in auxiliary storage.

Main memory includes a memory pool, referred to as a 4K memory pool, which includes 4K pages of memory to be allocated upon request. This pool is managed in order to service requests for pages of memory.

BRIEF SUMMARY

Main memory also includes, in accordance with an aspect of the present invention, one or more other memory pools that are to be managed.

The shortcomings of the prior art are overcome and additional advantages are provided through the provision of a computer program product for managing large page memory pools of a computing environment. The computer program product includes a storage medium readable by a processing circuit and storing instructions for execution by the processing circuit for performing a method. The method includes, for instance, determining whether a number of pages in a large page memory pool is at a certain level with respect to a minimum threshold; and adding one or more pages to the large page memory pool, responsive to the determining indicating that the number of pages is at the certain level with respect to the minimum threshold, the adding including: combining a plurality of small pages to create one or more large pages and adding the created one or more large pages to the large page memory pool; checking whether the number of pages is still at an unacceptable level with respect to the minimum threshold; and paging out one or more inactive large pages, responsive to the checking indicating the number of pages is still at an unacceptable level with respect to the minimum threshold, to increase the number of large pages in the large page memory pool.

Methods and systems relating to one or more aspects of the present invention are also described and claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of one or more aspects of the invention are apparent from the following detailed description taken in conjunction with the accompanying drawings in which:

DETAILED DESCRIPTION

In accordance with an aspect of the present invention, large page (e.g., 1M) memory pools are managed. For instance, a large page replacement technique is provided to effectively manage the large page memory pools. The large page replacement technique is automatically triggered based on defined thresholds that enable proactive management of the pools. As an example, the thresholds are checked when a large page memory pool is used to satisfy requests for small pages, and based on the thresholds, the large page replacement technique may be scheduled. As a further example, the thresholds are checked responsive to a request for a large page, and again based on the thresholds, the large page replacement technique may be scheduled.

Figure 1:
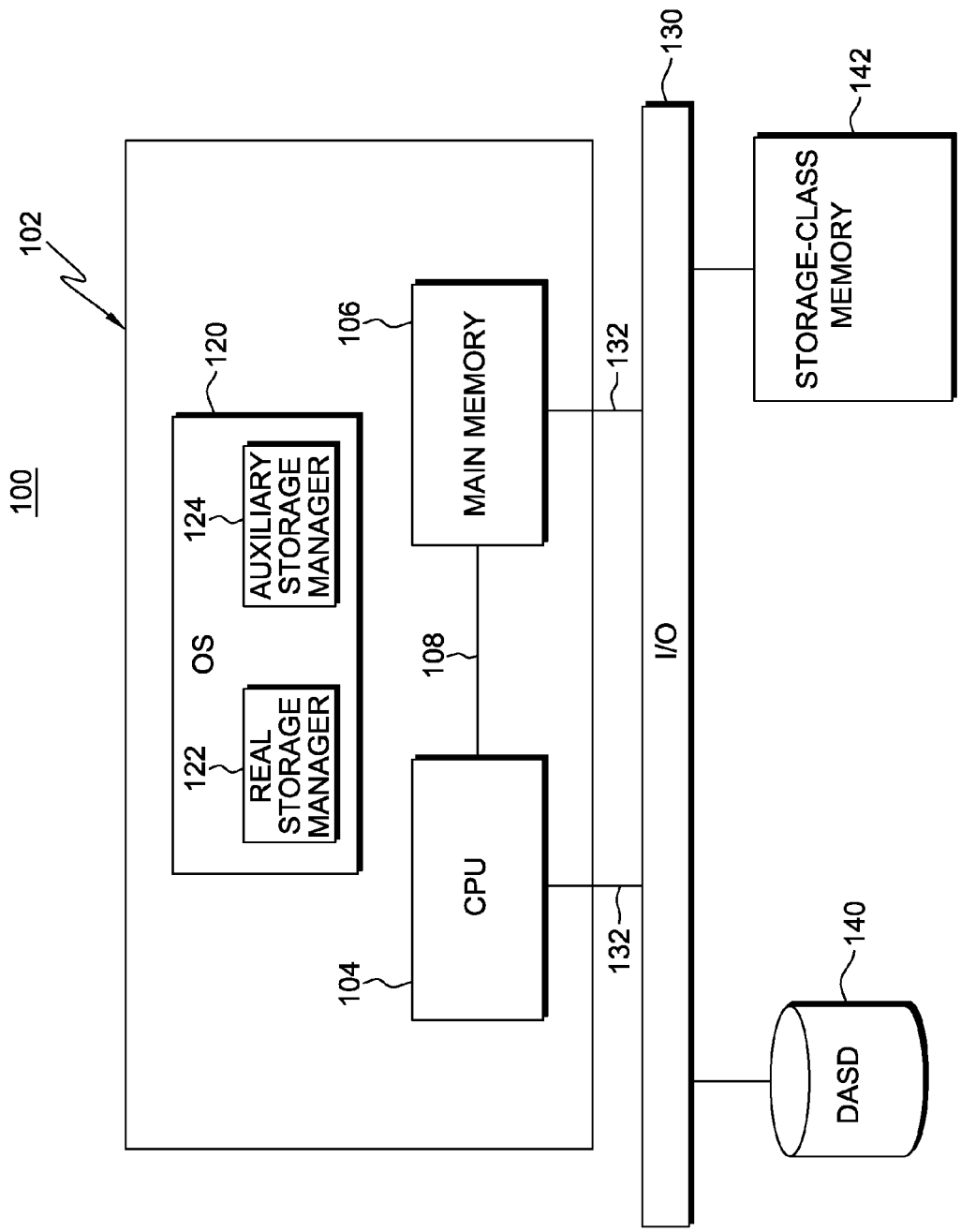
FIG. 1 depicts one example of a computing environment to incorporate and/or use one or more aspects of the present invention.

One embodiment of a computing environment to incorporate and/or use one or more aspects of the present invention is described with reference to FIG. 1. Computing environment 100 is based, for instance, on the Z/ARCHITECTURE® offered by International Business Machines Corporation, Armonk, N.Y. The Z/ARCHITECTURE® is described in an IBM® publication entitled, "z/Architecture Principles of Operation," IBM Publication No. SA22-7832-08, August 2010, which is hereby incorporated herein by reference in its entirety. In one example, a computing environment based on the Z/ARCHITECTURE® includes the ZENTERPRISE® 196 (Z96) system, offered by International Business Machines Corporation, Armonk, N.Y. IBM® and Z/ARCHITECTURE® are registered trademarks, and ZENTERPRISE 196 and Z196 are trademarks of International Business Machines Corporation, Armonk, N.Y., USA. Other names used herein may be registered trademarks, trademarks or product names of International Business Machines Corporation or other companies.

As one example, computing environment 100 includes a system 102, such as one or more servers, a central processing complex, etc., that includes, for instance, one or more central processing units (CPUs) 104 coupled to main memory 106 via one or more buses 108. One of the central processing units 104 may execute an operating system 120, such as the Z/OS® operating system offered by International Business Machines Corporation. In other examples, one or more of the central processing units may execute other operating systems or no operating system. Z/OS® is a registered trademark of International Business Machines Corporation, Armonk, N.Y., USA.

Central processing unit(s) 104 and main memory 106 are further coupled to an I/O subsystem 130 via one or more connections 132 (e.g., buses or other connections). The I/O subsystem provides connectivity to one or more auxiliary storage media, including, for instance, one or more direct access storage devices (DASD) 140 and storage-class memory 142 (e.g., flash memory). In one particular example of the Z/ARCHITECTURE®, the I/O subsystem is a channel subsystem. However, the I/O subsystem may be other than a channel subsystem, and the auxiliary storage media may be other than or in addition to DASD and storage-class memory.

Main memory and auxiliary storage are managed, in one example, by managers of operating system 120, including, for instance, a real storage manager 122 and an auxiliary storage manager 124. Real storage manager 122 is responsible for tracking the contents of main memory and managing the paging activities of main memory. Auxiliary storage manager 124 is responsible for tracking auxiliary storage and for working with the real storage manager to find locations to store real pages that are being paged-out from main memory.

One role of the real storage manager (RSM) is to manage the allocation of real memory page frames and to resolve references by the program to virtual memory pages that are not currently in real memory or do not yet exist (for example, first reference faults). The real storage manager maintains a free list of page frames that are available to satisfy page faults. This free list is referred to, for instance, as the Available Frame Queue (AFQ). Page frames are returned to the AFQ when storage is freed explicitly or implicitly when a program ends. In most environments, since the amount of virtual memory that is in use at any given instance may be larger than real memory, the system itself replenishes the AFQ. AFQ replenishment is driven by thresholds, such as AFQLOW and AFQOK, managed by a system resource manager (SRM) of the operating system. When the number of frames on the AFQ falls below AFQLOW, SRM calls the real storage manager to replenish the AFQ by removing some of the current page data from real memory. The system stops replenishing the AFQ when the AFQOK threshold is reached. The process of selecting which pages to displace from main memory and page them out to auxiliary storage is called page replacement. Page replacement in Z/OS® is accomplished, in one example, by implementing a least recently used technique.

Requests that are received for real memory pages may be for small pages (e.g., 4K pages) or large pages (e.g., 1M pages). To sustain the benefits of large pages, it is better that the operating system pages very little and it is best when the operating system does not page at all. To this end, a page replacement technique is provided, in accordance with an aspect of the present invention, specifically for large page pool management. This technique is proactive in that the number of pages in the large page memory pool is checked earlier than the indications provided by SRM and the AFQLOW and AFQOK thresholds described above, and action is taken, if indicated.

Figure 2:
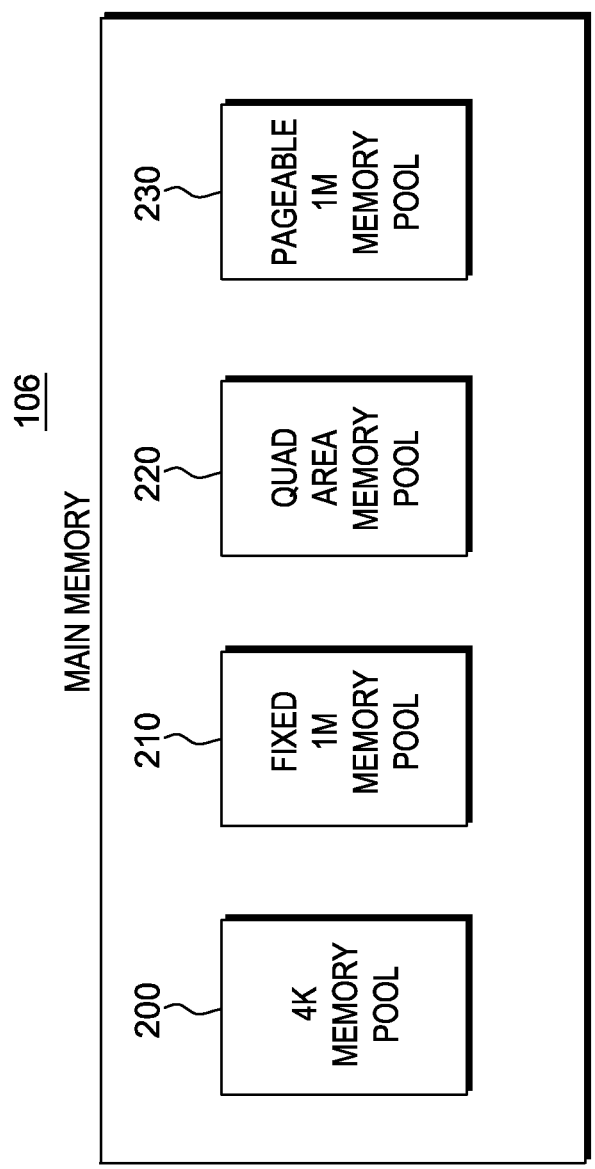
FIG. 2 depicts examples of memory pools in main memory, in accordance with an aspect of the present invention.

A memory pool includes a plurality of page frames of a particular size. In one example, main memory 106 includes a plurality of memory pools, as depicted in FIG. 2. For example, main memory 106 includes a 4K memory pool 200 used to satisfy requests (e.g., from the operating system and applications) for 4K page frames (a frame is the real memory backing the requested page); a fixed 1M memory pool 210 used to satisfy requests for 1M fixed large page frames; a quad area memory pool 220 used to manage four contiguous 4K frames in physical memory; and in accordance with an aspect of the present invention, a pageable 1M memory pool 230 used to service pageable 1M page frame requests.

When a request is received for a page frame of a particular size, a search is performed in one or more memory pools for the requested frame. The memory pools are searched, in accordance with an aspect of the present invention, in a defined order that is based on the requested size of the frame. One embodiment of a search order to satisfy 4K page frame requests is:

I. Allocate from the 4K available page frame pool;
II. Allocate from the available pageable 1M pool;
III. Allocate from the available quad area pool; and
IV. Allocate from the available fixed 1M pool.

In one example, when the pageable large page pool is used for a 4K page request, a determination is made as to whether the pool needs to be managed by either adding pages to the pool or removing pages from the pool, as described in further detail below.

One embodiment of the logic used to service a request for a 4K page frame and further to manage a large page pool is described with reference to FIG. 3. In one example, the real storage manager performs this logic.

Figure 3:
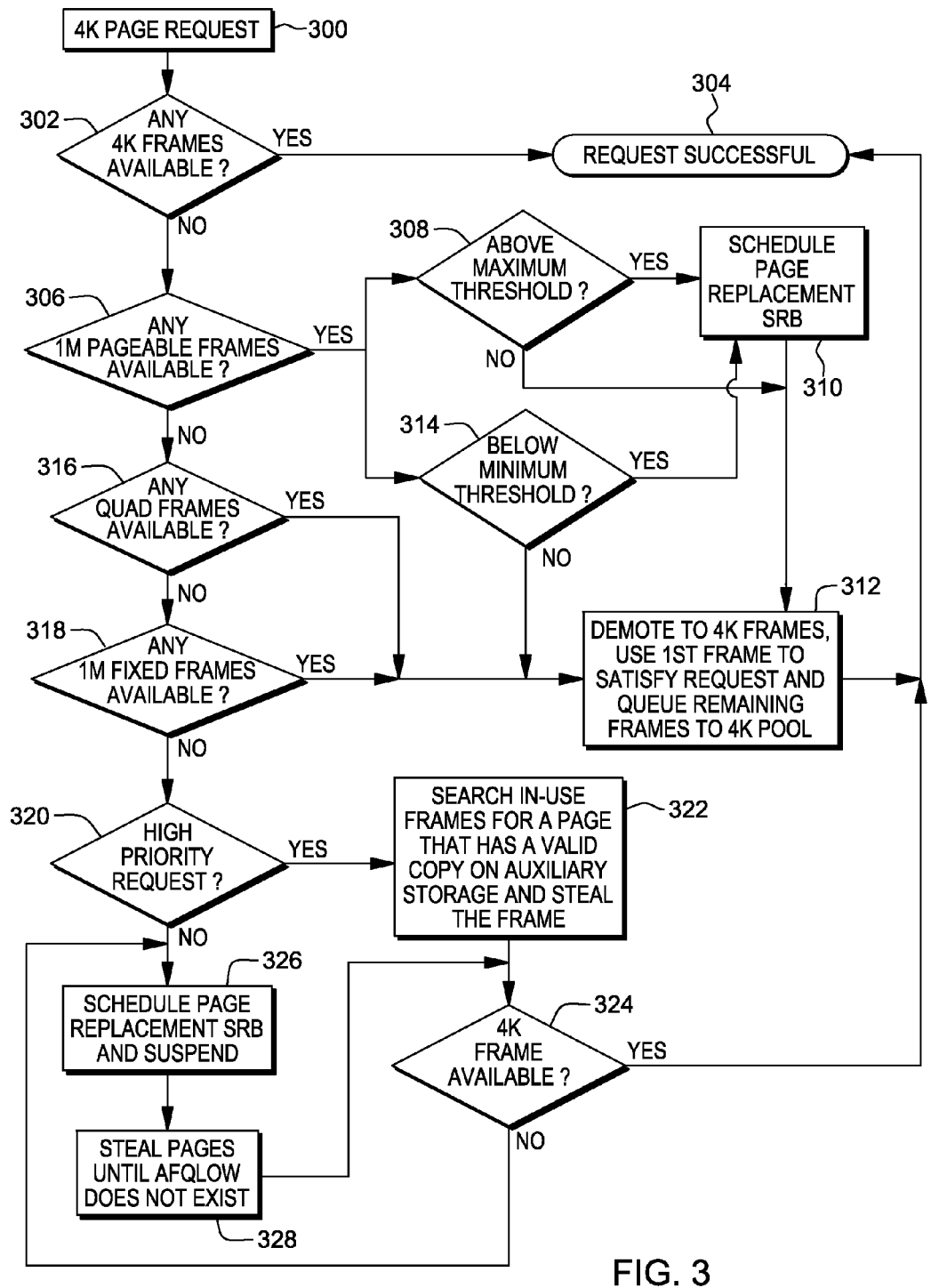
FIG. 3 depicts one embodiment of the logic to manage a large page memory pool, responsive to servicing a request for a 4K page frame, in accordance with an aspect of the present invention.

Referring to FIG. 3, responsive to the real storage manager receiving a request for a 4K page of real memory (e.g., due to a page fault), STEP 300, a determination is made as to whether there are any 4K frames available in the 4K memory pool, INQUIRY 302. If there are 4K frames available, one of those frames is used to service the request and the request is successful, STEP 304. However, if there are no 4K frames available, a further determination is made as to whether there are any 1M pageable frames available in the pageable 1M memory pool, INQUIRY 306. If there is at least one 1M pageable frame available, then in this example, a determination is made as to whether the number of pages in the pageable 1M memory pool is above a maximum threshold, INQUIRY 308. The maximum threshold is a selected value used to determine if pages should be removed from the pool. In one example, the threshold is 75%; i.e., e.g., if there is room in the pool for 100 pages, then the maximum threshold is 75 pages. This threshold is separate from the AFQOK threshold above, and is used to proactively manage the large page memory pool.

If the number of pages in the pool is above the maximum threshold, then a page replacement service request block (SRB) is scheduled, STEP 310, as described below. Thereafter, or if the number of pages in the large page memory pool is not above the maximum threshold, then a 1M pageable frame is selected from the pageable 1M memory pool and is demoted to a plurality of frames (e.g., 256 4K frames), STEP 312. In one example, this includes changing control blocks associated with the 4K frames. For example, each 4K frame has associated therewith a control block (e.g., page frame table entry). Within each control block is an identifier (e.g., QID) that specifies the type of page. Thus, to demote the 1M frame, the QID for each of the 4K blocks is changed from a value indicating 1M to a value indicating 4K. One of the demoted frames (e.g., the first frame) is selected to satisfy the request and the remaining frames are queued to the 4K memory pool. The request is successful, STEP 304.

Returning to INQUIRY 306, additionally, a determination is made as to whether the number of pages in the pageable 1M memory pool is below a minimum threshold, INQUIRY 314. Similar to the maximum threshold, the minimum threshold is a selected value used to determine if pages should be added to the pool. In one example, the threshold is 25%; i.e., e.g. if there is room in the pool for 100 pages, then the minimum threshold is 25 pages. This threshold is separate from AFQLOW, and is used to proactively add pages to the pool (even before AFQLOW is reached).

If the number of pages is below the minimum threshold, then the page replacement SRB is scheduled, STEP 310. Thereafter, or if the number of pages in the large memory pool is not below the minimum threshold, then processing continues with STEP 312, in which the selected page is demoted, if not previously performed responsive to INQUIRY 308.

In a further embodiment, if the maximum threshold is checked and the number of pages in the large page memory pool is above the maximum threshold, then the below minimum threshold check is bypassed. Likewise, if the below minimum threshold is checked first and the number of pages in the large page memory pool is below the minimum threshold, the above maximum threshold check can be bypassed.

Returning to INQUIRY 306, if there are no 1M pageable frames available, then another determination is made as to whether there are any quad frames available in the quad area memory pool, INQUIRY 316. If there is at least one quad frame available, then a selected quad frame is demoted to a plurality of frames (e.g., four 4K frames), STEP 312. One frame (e.g., the first frame) is used to satisfy the request and the remaining frames are queued to the 4K memory pool. The request is successful, STEP 304.

Returning to INQUIRY 316, if there are no quad frames available, then a further determination is made as to whether there are any 1M fixed frames available in the fixed 1M memory pool, INQUIRY 318. If there is at least one fixed 1M frame available, then a selected fixed 1M frame is demoted to a plurality of frames (e.g., 256 4K frames), STEP 312. One frame (e.g., the first frame) is used to satisfy the request and the remaining frames are queued to the 4K memory pool. The request is successful, STEP 304.

If, after completing the search order of the 4K memory pool, the pageable 1M memory pool, the quad area memory pool, and the fixed 1M memory pool, and there are no frames available, a determination is made as to whether the request is a high priority request, INQUIRY 320. If it is a high priority request, as specified by, for instance, an indicator, a search is performed of in-use frames for a page that has a valid copy on auxiliary storage and that page is stolen (e.g., a desirable in-use frame is selected, its data is copied to an available 4K frame enabling use of the desired in-use frame), STEP 322. Thereafter, a determination is made as to whether a 4K frame is available, INQUIRY 324. If so, then the request is successful, STEP 304. Otherwise, processing continues to STEP 326, described below.

Returning to INQUIRY 320, if it is not a high priority request, in one example, the page replacement SRB is scheduled and the requestor is suspended/waits, STEP 326, until, for instance, enough pages are stolen that the AFQLOW condition does not exist, STEP 328. Processing then continues at INQUIRY 324.

In addition to servicing small page requests, other types of requests are serviced, such as requests for pageable large pages. In accordance with an aspect of the present invention, a defined order is used to search memory pools for frames that satisfy the requests. Again, the search order is based on the requested size. For example, for a pageable 1M page request, the search order includes:
 I. Search available pageable 1M pools;
 II. Search available fixed 1M pools; and
 III. Search available 4K frame pools.

Figure 4:
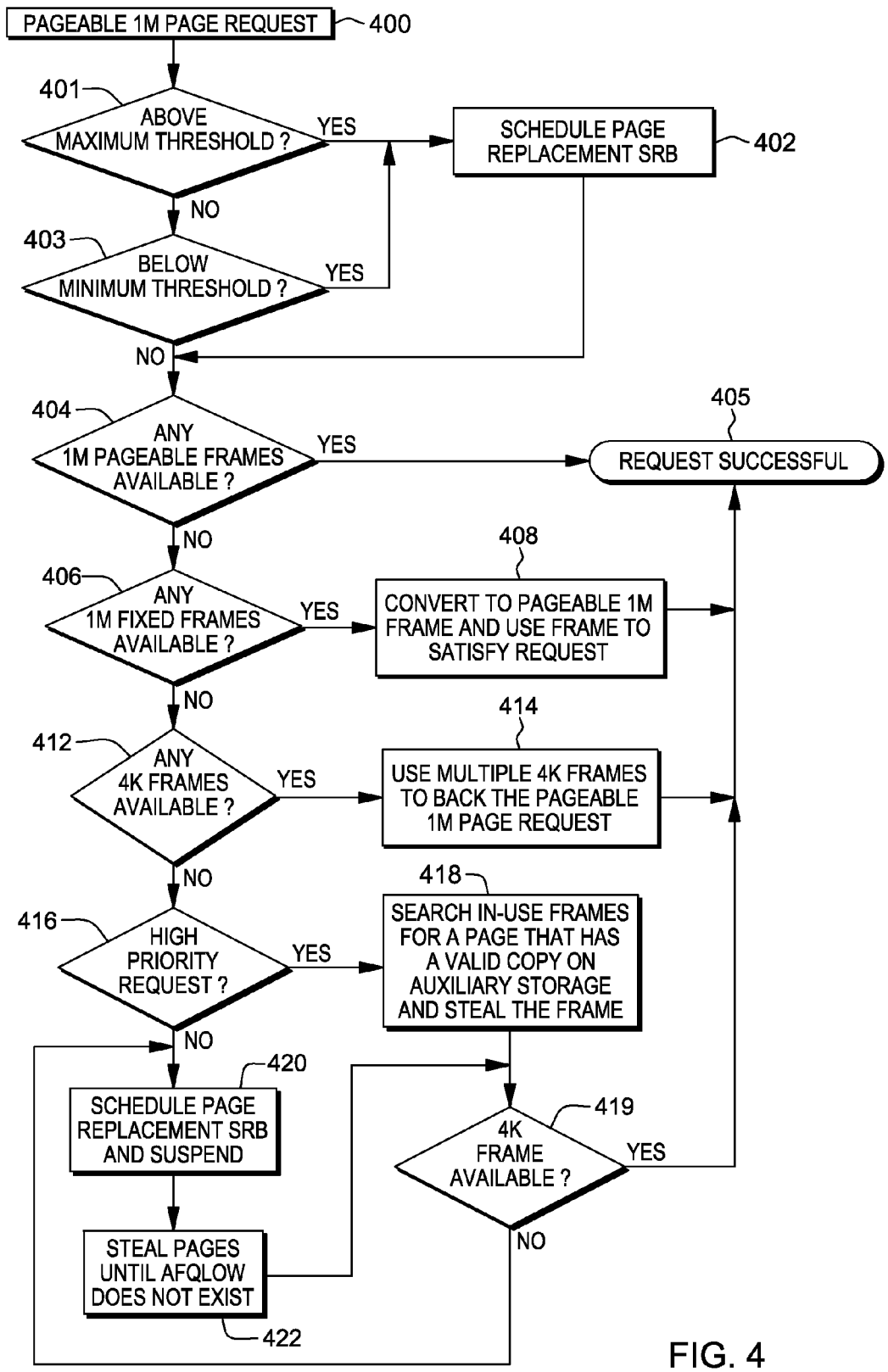
FIG. 4 depicts one embodiment of the logic to manage a large page memory pool, responsive to servicing a request for a 1M page frame, in accordance with an aspect of the present invention.

One embodiment of the logic to use the search order to service a pageable 1M page request and to manage the large page memory pool is described with reference to FIG. 4. In one example, it is the real storage manager that performs this logic.

Responsive to the real storage manager receiving a request for a pageable 1M page, STEP 400, the real storage manager determines whether the large page pool is to be adjusted. For instance, a check is made to determine whether the number of pages in the large page memory pool is above the maximum threshold (this is the same threshold checked in FIG. 3), INQUIRY 401. If it is above the maximum threshold, then a page replacement SRB is scheduled, STEP 402. However, if it is not above the maximum threshold (or in addition to checking for the maximum threshold), a determination is made as to whether the number of pages in the large page memory pool is below the minimum threshold (this is the same threshold checked in FIG. 3), INQUIRY 403. If it is below the minimum threshold, then the page replacement SRB is scheduled, STEP 402.

Thereafter, or if the large page memory pool is not below the minimum threshold, processing continues with allocation of the 1M memory page. Thus, a determination is made as to whether there are any pageable 1M frames available in the pageable 1M memory pool, INQUIRY 404. If there are pageable 1M frames available, then one is selected to service the request and the request is successful, STEP 405. Otherwise, a further determination is made as to whether there are any fixed 1M frames available in the fixed 1M memory pool, INQUIRY 406. If there are fixed 1M frames available, then a selected fixed 1M frame is converted to a pageable 1M frame, STEP 408. In one example, the conversion includes changing the QID of each of the 256 control blocks of the page from an identifier specifying a fixed 1M page to an identifier specifying a pageable 1M page. The converted frame is then used to satisfy the request, and the request is successful, STEP 405.

Returning to INQUIRY 406, if there are no fixed 1M frames available, then another determination is made as to whether there are any 4K frames available in the 4K memory pool, INQUIRY 412. If there are 4K frames available, then multiple 4K frames are used to back the pageable 1M page request, STEP 414. In one example, this includes demoting the 1M pageable request to a 4K request of size 1M. Then, as the storage is referenced, 4K frames are used to back the data. The request is successful, STEP 405.

Returning to INQUIRY 412, if there are no frames available in the pageable 1M memory pool and the fixed 1M memory pool, and there are no frames or not enough frames in the 4K memory pool, a determination is made as to whether the request is a high priority request, INQUIRY 416. If it is a high priority request, as specified by, for instance, an indicator, a search is performed of in-use frames for a page that has a valid copy on auxiliary storage and that page is stolen, STEP 418. Thereafter, a determination is made as to whether a 4K frame is available, INQUIRY 419. If it is available, then the request is successful, STEP 405. Otherwise, processing continues to STEP 420, described below.

Returning to INQUIRY 416, if it is a low priority request, a page replacement SRB is scheduled and the requestor is suspended/waits, STEP 420, until enough pages are stolen that an AFQLOW condition does not exist, STEP 422. Then, processing continues with INQUIRY 419.

As described above, one aspect of servicing a request, whether it is for a small page (e.g., 4K) or a large page (e.g., 1M), includes managing the large page memory pool at prescribed times. One part of this management includes scheduling an SRB to perform page replacement. One embodiment of the logic to perform page replacement is described with reference to FIG. 5. In one example, the real storage manager performs this logic.

Figure 5:
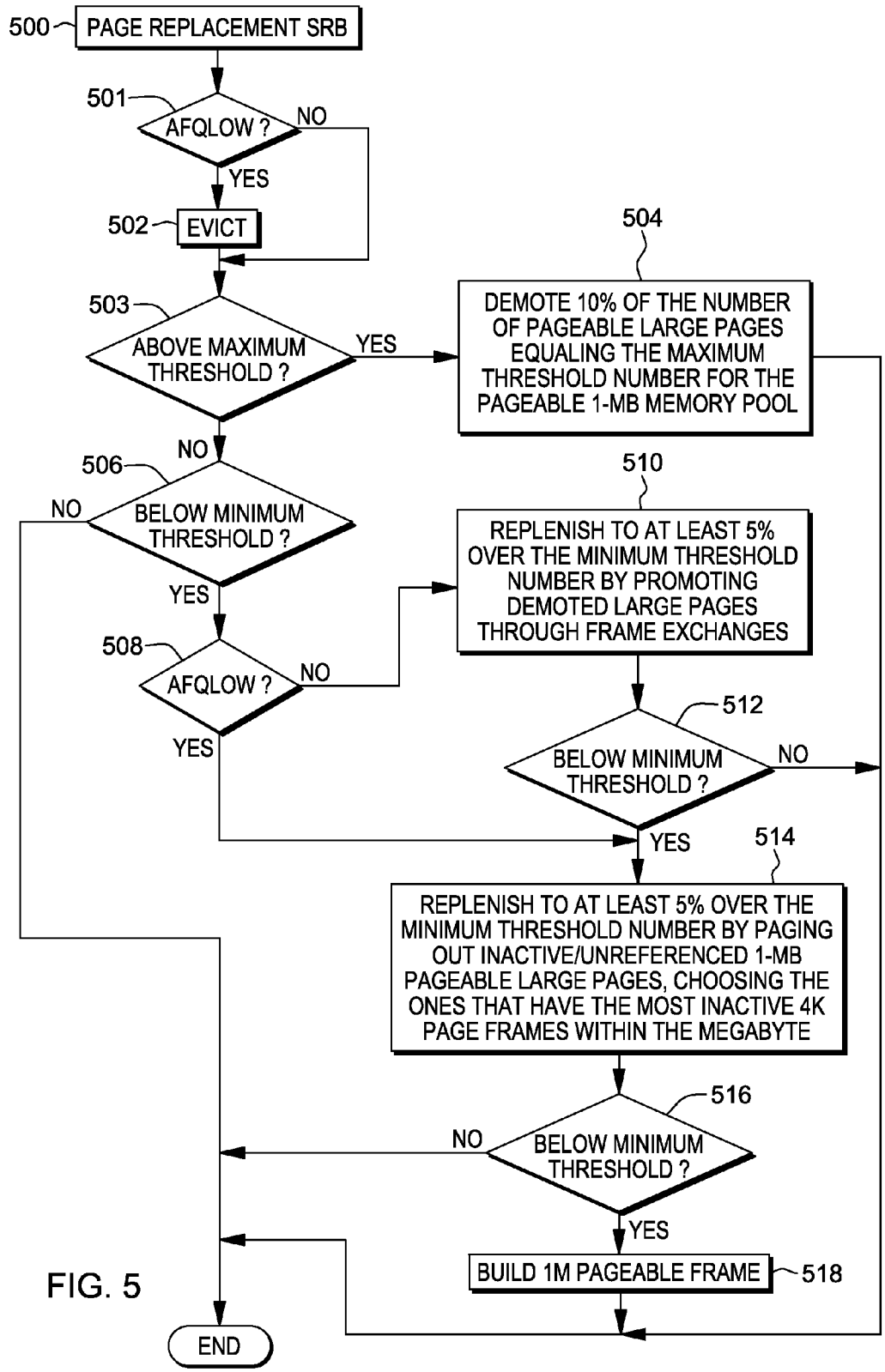
FIG. 5 depicts one embodiment of the logic to manage a large page memory pool, including adjusting the number of large pages in the pool, in accordance with an aspect of the present invention.

Referring to FIG. 5, initially, a page replacement SRB is scheduled, STEP 500. Responsive thereto, a determination is made as to whether an AFQLOW condition has occurred, INQUIRY 501. AFQLOW is a condition where the 4K pool is at or below a predefined low level. If AFQLOW has occurred, then enough 4K pages are evicted from main memory out to auxiliary storage so that there is no longer an AFQLOW condition, STEP 502. Thereafter, or if the AFQLOW condition has not occurred, a determination is made as to whether the number of pages in the pageable large page memory pool being managed is above the maximum threshold (same threshold as FIG. 3), INQUIRY 503. If the maximum threshold has been exceeded, then a certain number of pages are demoted to small pages and placed in the small page memory pool, STEP 504. For instance, a percentage (e.g., 10%) of the number of pageable large pages equaling the maximum threshold number for the pageable 1M memory pool is demoted. For instance, if the pool can hold 100 frames, the threshold is 75 and currently there are 85 frames in the pool, then 10%×(85-75) pages are demoted. Other percentages and formulas may be used.

Returning to INQUIRY 503, if the maximum threshold is not exceeded, then a further determination is made as to whether the number of pages in the pool is below the minimum threshold (same threshold as FIG. 3), INQUIRY 506. If the number of pages in the pool is below the minimum threshold, then a further determination is made as to whether an AFQLOW condition has occurred, INQUIRY 508. If AFQLOW has not occurred, indicating there are a sufficient number of pages in the 4K pool, then the large memory pool is replenished with a coalescing of 4K pages (taken from the 4K pool). For instance, an attempt is made to replenish to at least a certain percentage (e.g., 5%) over the minimum threshold number by promoting demoted large pages through frame exchanges, STEP 510. For instance, for the 4K frames within a large page that are in-use, the system finds available 4K frames to copy the data into, so that the 4K frames within the large page can be made available in order that the large page can be coalesced. In one example, to promote the 4K pages, the QIDs of 256 4K pages are changed from a value indicating a 4K page to a value indicating a 1M pageable page.

Thereafter, a determination is made as to whether the number of pages is still below the minimum threshold, INQUIRY 512. If so, then an attempt is made to replenish the pool to at least a certain percentage (e.g., 5%) over the minimum threshold number by paging out inactive/unreferenced 1M pageable large pages, choosing the pages that have the most inactive 4K page frames within the 1M, as described below, STEP 514. Thereafter, if the number of pages is still below the minimum threshold, INQUIRY 516, at least one 1M pageable frame is built, STEP 518. For instance, memory is searched for clusters of 4K available frames within a segment boundary. If a high percentage in this cluster is available, an attempt is made to exchange the in-use 4K frames in the cluster to build the 1M pageable large frame.

Thereafter, or the number of pages is not below the minimum threshold, processing is complete.

Returning to INQUIRY 508, in one example, if AFQLOW has occurred, then processing continues with STEP 514.

In one embodiment, to determine if a page is inactive, reference bits associated with the page are used. For instance, each 4K byte block of memory has a storage key associated therewith, which includes a plurality of indicators, one of which is a reference bit that indicates whether the block associated with the key has been accessed. To determine if a large page is currently inactive, in one example, an instruction is used to reset the reference bits in the storage keys associated with the page, and then, in a predefined amount of time later, the reference bits are checked. If they are still off, then the page is inactive and a candidate for paging out. In one particular example, page out determination via the instruction is performed via multiple passes. For instance, in a first pass, large pages are paged out, if all 4K frames are inactive. In a second pass, large pages are paged out if 50% (as an example) of 4K frames are inactive. In a third pass, any large pages are paged out, regardless of how many 4K frames are inactive.

In one example, the instruction used to reset the bits is a Reset Reference Bit Multiple (RRBM) instruction. By using this instruction, interrogation of a large page takes four instructions (64 contiguous 4K page frames at a time), rather than 256 instructions.

Figure 6:
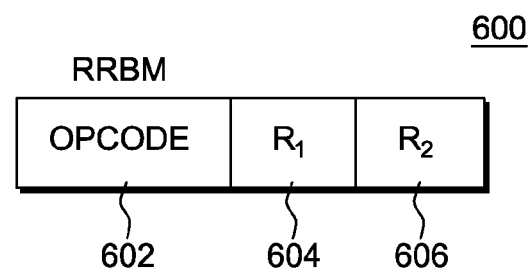
FIG. 6 depicts one example of a Reset Reference Bits Multiple instruction used in accordance with an aspect of the present invention.

One embodiment of the Reset Reference Bits Multiple instruction is described with reference to FIG. 6. In one example, a Reset Reference Bits Multiple Instruction 600 includes an opcode 602 identifying the Reset Reference Bits Multiple instruction; a first general register 604 described below; and a second general register 606, which designates the first of 64 blocks in absolute storage on a 64 block (256K) boundary.

In operation, beginning with the block designated by the address in general register 606, the reference bits in the storage keys of the 64 consecutive 4K blocks are inspected and reset. For each of the 64 blocks, the reference bit is placed in an ascending bit position of general register 604, beginning with bit position zero of the register. Subsequent to the inspection of each reference bit, the reference bit in the storage key is reset to zero.

Described in detail above is a capability for managing large page memory pools, including pageable large pool memory pools. The managing includes proactively determining when to adjust the pool, and adjusting the pool accordingly. Management of the large page pools enhances system performance by, for instance, minimizing page outs.

In one example, a particular order is provided when replenishing a pageable large page memory pool. First, the replenishment includes a coalescing of 4K pages, and then, if the number of pages is still below the minimum threshold, replenishment includes paging out large pages starting with the greatest amount of inactive pages.

As one embodiment, when RSM goes to the large page pools in order to satisfy a 4K page frame request, it also schedules the page replacement SRB to replenish the 4K memory pool, as follows, in one example:

1. If the number of available frames in the pageable 1M memory pool exceeds the maximum threshold, the pageable 1M memory pool is decreased by some percentage and the frames are moved to the 4K available page frame queues (in the 4K memory pool);

2. If the number of available frames in the pageable 1M memory pool is below the maximum threshold, but above the minimum threshold, the size of the pageable 1M memory pool remains the same and a large page will be demoted into 256 consumable 4K page frames;

3. If the number of frames in the pageable 1M memory pool is at or below the minimum threshold, an attempt is made to evict 4K pages from main memory out to auxiliary storage; and 4. If there is still not a satisfactory number of frames on the 4K available frame queues, 1M pageable large pages that contain the most inactive 4K page frames are paged out.

When a request comes in for 1M pageable page frames and the pageable 1M memory pool is empty, an SRB is scheduled to proactively replenish the pageable 1M memory pool to some static minimum threshold number of 1M page frames.

As one embodiment, the pageable 1M memory pool is replenished, as follows:

If there are plenty of available 4K frames and there is not a real frame shortage condition, then:
  Reclaim pageable 1M page frames that were demoted in order to satisfy 4K page requests via a frame exchange mechanism;
  Extend the pageable 1M memory pool by the minimum threshold number as current conditions allow it.
  Thereafter, or otherwise, page out inactive/unreferenced 1M pageable large pages (choose the pages that have the most inactive 4K frames within the megabyte).
  Additional information relating to main memory and auxiliary storage is provided in the following commonly assigned applications co-filed herewith, each of which is hereby incorporated herein by reference in its entirety: U.S. Ser. No. 13/101,731, "MANAGING STORAGE EXTENTS AND THE OBTAINING OF STORAGE BLOCKS WITHIN THE EXTENTS"; U.S. Ser. No. 13/101,791, "MANAGING ALLOCATION OF MEMORY PAGES"; and U.S. Ser. No. 13/101,725, entitled "SELECTING AN AUXILIARY STORAGE MEDIUM FOR WRITING DATA OF REAL STORAGE PAGES".

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 7:
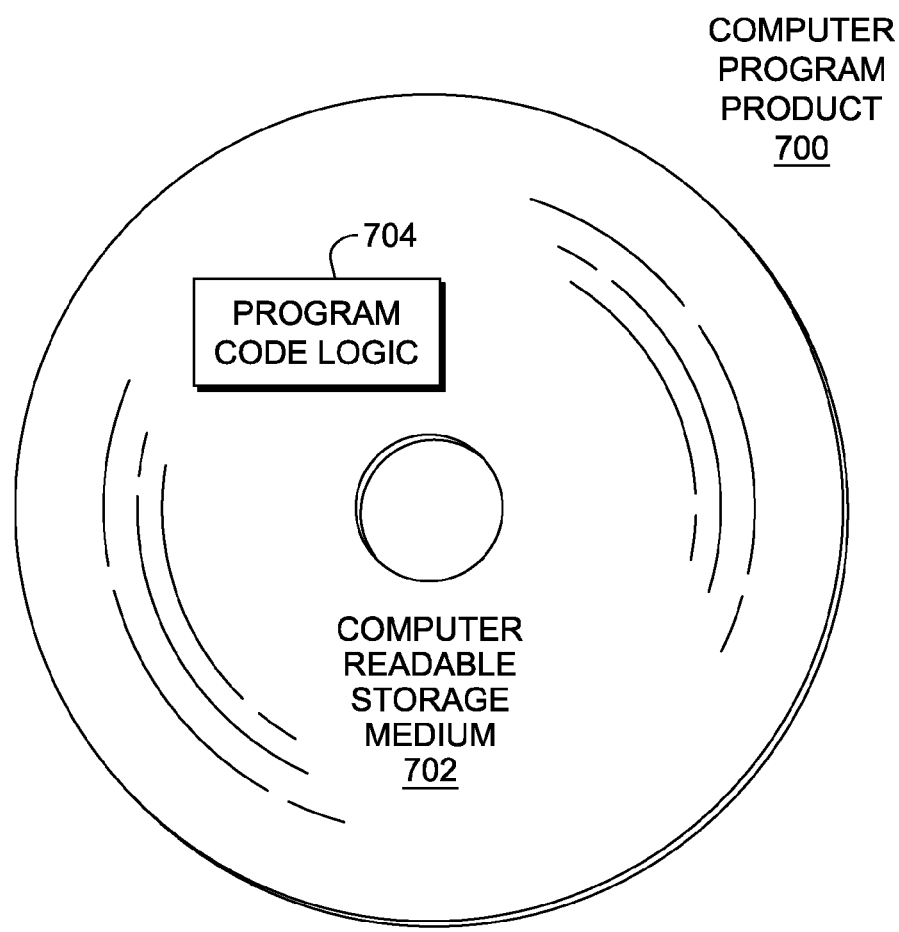
FIG. 7 depicts one embodiment of a computer program product to incorporate one or more aspects of the present invention.

Referring now to FIG. 7, in one example, a computer program product 700 includes, for instance, one or more non-transitory computer readable storage media 702 to store computer readable program code means or logic 704 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, although examples of auxiliary storage are described herein, other types of auxiliary storage may be used without departing from the spirit of the present invention. Further, other considerations may be used to determine when or how to manage the large page pools. Further, pools other than pageable large page pools may be managed, in accordance with an aspect of the present invention. Yet further, other threshold values and/or or percentages may be used.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for managing large page memory pools of a computing environment, said computer program product comprising:
a non-transitory computer readable storage medium readable by a processing circuit and storing instructions for execution by the processing circuit for performing a method comprising:
determining whether a number of pages in a large page memory pool is at a certain level with respect to a minimum threshold; and
adding multiple pages to the large page memory pool, based on the determining indicating that the number of pages is at the certain level with respect to the minimum threshold, wherein the adding adds the multiple pages by prioritized order from multiple different sources until the number of pages in the large page memory pool is at an acceptable level with respect to the minimum threshold, the adding comprising:
adding one or more pages from a first source comprising a small page memory pool, by combining a plurality of small pages of the small page memory pool to create one or more large pages and adding the created one or more large pages to the large page memory pool;
checking whether the number of pages in the large page memory pool is still at an unacceptable level with respect to the minimum threshold; and
based on the checking indicating the number of pages in the large page memory pool is still at an unacceptable level with respect to the minimum threshold, adding one or more large pages from a second source different from the first source, the second source comprising one or more inactive large pages, by paging out the one or more inactive large pages to increase the number of large pages in the large page memory pool.

2. The computer program product of claim 1, wherein the certain level comprises below the minimum threshold.

3. The computer program product of claim 1, wherein the combining is performed one or more times in an attempt to replenish the large page memory pool to at least a number defined with respect to the minimum threshold, the number being a percentage over the minimum threshold, and between the minimum threshold and a maximum threshold.

4. The computer program product of claim 1, wherein the paging out is performed one or more times in an attempt to replenish the large page memory pool to at least a defined percentage over the minimum threshold.

5. The computer program product of claim 1, wherein the method further comprises determining the one or more inactive large pages to be paged out, the determining using an instruction, the instruction checking one or more reference indicators associated with the one or more inactive large pages.

6. The computer program product of claim 5, wherein the instruction comprises a Reset Reference Bits Multiple (RRBM) instruction, the RRBM interrogating 64 contiguous 4K page frames per execution of the RRBM.

7. The computer program product of claim 1, wherein the method further comprises:
determining whether the number of pages in the large page memory pool is at a specified level with respect to a maximum threshold; and
based on being at the specified level with respect to the maximum threshold, demoting a percentage of a number of large pages of the large page memory pool.

8. The computer program product of claim 7, wherein the specified level comprises above the maximum threshold.

9. The computer program product of claim 1, wherein the method further comprises determining whether a predefined amount of small pages is available in the small page memory pool, and performing the adding, based on the predefined amount of small pages being available.

10. The computer program product of claim 1, wherein the method further comprises:
determining, based on the paging out, whether the number of pages is still at an unacceptable level with respect to the minimum threshold;
creating one or more large page frames, based on the number of pages still being at an unacceptable level, the creating building the one or more large page frames by searching for one or more clusters of available small pages within a segment boundary, and based on a sufficient percentage of small pages within a segment boundary being available, exchanging in-use small pages in the one or more clusters to create the one or more large page frames; and
adding the created one or more large page frames to the large page memory pool.

11. The computer program product of claim 1, wherein the method further comprises performing the determining based on one of the following:
an indication that the large page memory pool is empty of available large page frames; and
using the large page memory pool to satisfy a request for a small page frame.

12. A computer system for managing large page memory pools of a computing environment, said computer system comprising:
a memory; and
a processor in communications with the memory, wherein the computer system is configured to perform a method, said method comprising:
determining whether a number of pages in a large page memory pool is at a certain level with respect to a minimum threshold; and
adding multiple pages to the large page memory pool, based on the determining indicating that the number of pages is at the certain level with respect to the minimum threshold, wherein the adding adds the multiple pages by prioritized order from multiple different sources until the number of pages in the large page memory pool is at an acceptable level with respect to the minimum threshold, the adding comprising:
adding one or more pages from a first source comprising a small page memory pool, by combining a plurality of small pages of the small page memory pool to create one or more large pages and adding the created one or more large pages to the large page memory pool;
checking whether the number of pages in the large page memory pool is still at an unacceptable level with respect to the minimum threshold; and
based on the checking indicating the number of pages in the large page memory pool is still at an unacceptable level with respect to the minimum threshold, adding one or more large pages from a second source different from the first source, the second source comprising one or more inactive large pages, by paging out the one or more inactive large pages to increase the number of large pages in the large page memory pool.

13. The computer system of claim 12, wherein the combining is performed one or more times in an attempt to replenish the large page memory pool to at least a number defined with respect to the minimum threshold, the number being a percentage over the minimum threshold, and between the minimum threshold and a maximum threshold.

14. The computer system of claim 12, wherein the method further comprises determining the one or more inactive large pages to be paged out, the determining using an instruction, the instruction checking one or more reference indicators associated with the one or more inactive large pages, and wherein the instruction comprises a Reset Reference Bits Multiple (RRBM) instruction, the RRBM interrogating 64 contiguous 4K page frames per execution of the RRBM.

15. The computer system of claim 12, wherein the method further comprises:
 determining whether the number of pages in the large page memory pool is at a specified level with respect to a maximum threshold; and
 based on being at the specified level with respect to the maximum threshold, demoting a percentage of a number of large pages of the large page memory pool.

16. The computer system of claim 12, wherein the method further comprises determining whether a predefined amount of small pages is available in the small page memory pool, and performing the adding, based on the predefined amount of small pages being available.

17. The computer system of claim 12, wherein the method further comprises:
 determining, based on the paging out, whether the number of pages is still at an unacceptable level with respect to the minimum threshold;
 creating one or more large page frames, based on the number of pages still being at an unacceptable level, the creating building the one or more large page frames by searching for one or more clusters of available small pages within a segment boundary, and based on a sufficient percentage of small frames within a segment boundary being available, exchanging in-use small pages in the one or more clusters to create the one or more large page frames; and
 adding the created one or more large page frames to the large page memory pool.

18. A method of managing large page memory pools of a computing environment, said method comprising:
 determining whether a number of pages in a large page memory pool is at a certain level with respect to a minimum threshold; and
 adding, by a processor, multiple pages to the large page memory pool, based on the determining indicating that the number of pages is at the certain level with respect to the minimum threshold, wherein the adding adds the multiple pages by prioritized order from multiple different sources until the number of pages in the large page memory pool is at an acceptable level with respect to the minimum threshold, the adding comprising:
  adding one or more pages from a first source comprising a small page memory pool, by combining a plurality of small pages of the small page memory pool to create one or more large pages and adding the created one or more large pages to the large page memory pool;
  checking whether the number of pages in the large page memory pool is still at an unacceptable level with respect to the minimum threshold; and
  based on the checking indicating the number of pages is still at an unacceptable level with respect to the minimum threshold, adding one or more large pages from a second source different from the first source, the second source comprising one or more inactive large pages, by paging out the one or more inactive large ages to increase the number of large pages in the large page memory pool.

19. The method of claim 18, further comprising:
 determining whether the number of pages in the large page memory pool is at a specified level with respect to a maximum threshold; and
 based on being at the specified level with respect to the maximum threshold, demoting a percentage of a number of large pages of the large page memory pool.

20. The method of claim 18, further comprising determining whether a predefined amount of small pages is available in the small page memory pool, and performing the adding, based on the predefined amount of small pages being available.

* * * * *